United States Patent

[11] 3,561,349

| [72] | Inventors | Sam I. Endo<br>Sun Valley;<br>James H. Tarrant, Los Angeles, Calif. |
|---|---|---|
| [21] | Appl. No. | 730,353 |
| [22] | Filed | May 20, 1968 |
| [45] | Patented | Feb. 9, 1971 |
| [73] | Assignee | Farmer Bros. Co.<br>Torrance, Calif.<br>a corporation of California |

[54] BREWING MEANS FOR PREPACKAGED COFFEE
9 Claims, 10 Drawing Figs.

[52] U.S. Cl. .................................................. 99/307,
99/295
[51] Int. Cl. .................................................. A47j 31/34
[50] Field of Search.......................................... 99/295,
303, 282, 302, 307, 77.1, 306

[56] References Cited
UNITED STATES PATENTS
3,450,024  6/1969  Martin.......................... 99/295

*Primary Examiner*—Robert W. Jenkins
*Attorney*—Nilsson, Robbins, Wills & Berliner ABSTRACT: A coffee brewing means having a downwardly directed discharge spray head for hot water recessed in a surface, and a holder for prepackaged coffee for positioning the package under the spray head and underlying the surrounding surface in proximity thereto so that upon initial wetting of the coffee, the resulting expansion of the coffee presses the upper side of the package against the surface surrounding the spray head and forms a seal therewith so that the water issuing from the spray head is confined to flow through the package.

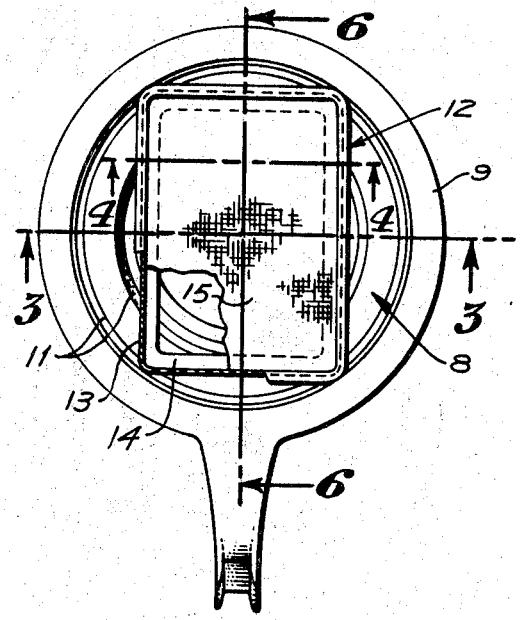
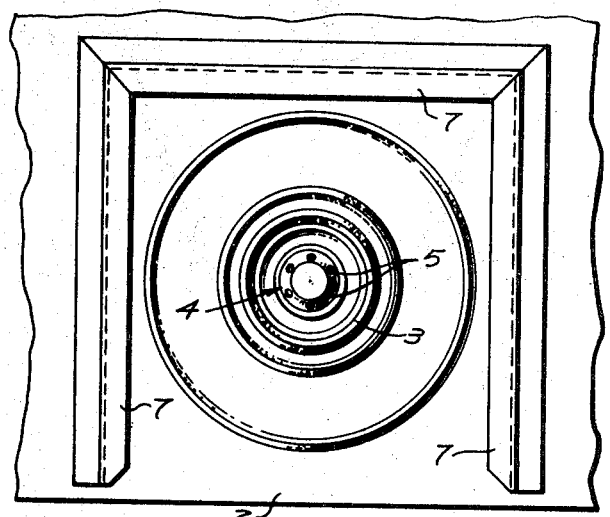
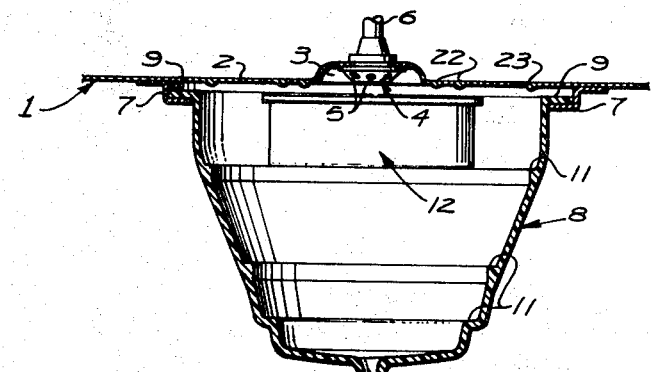
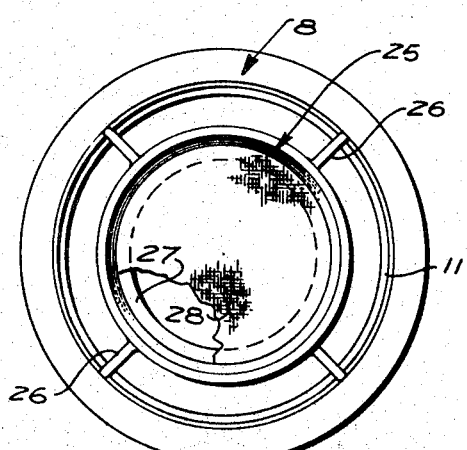
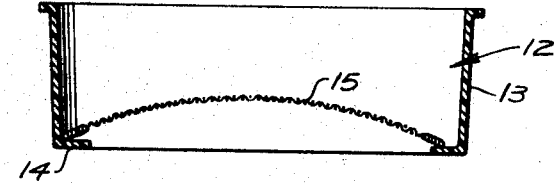

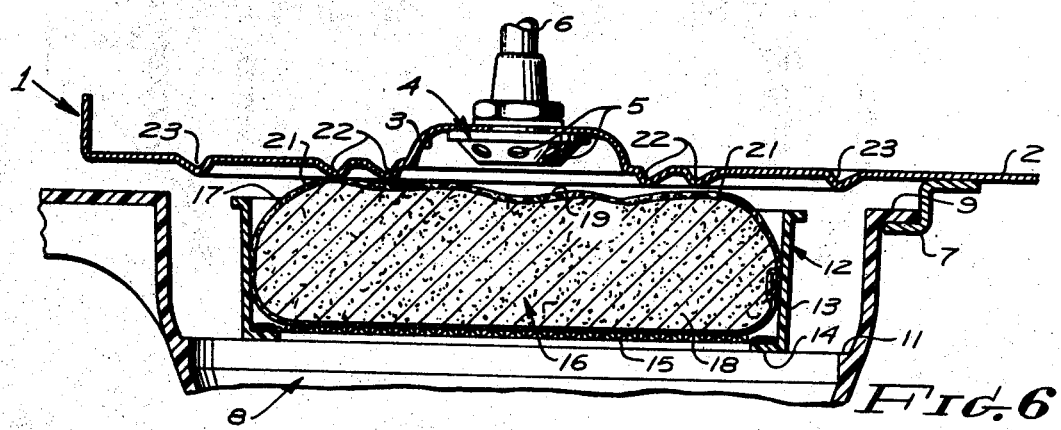
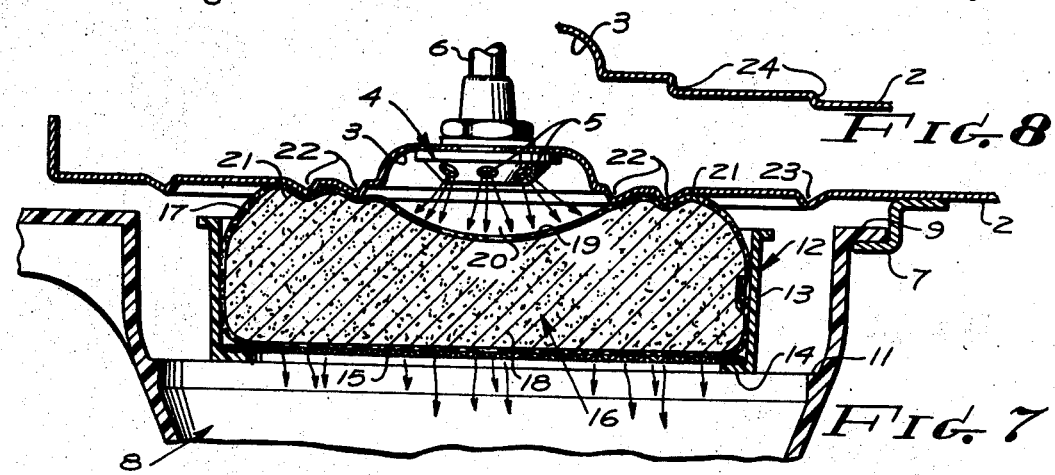
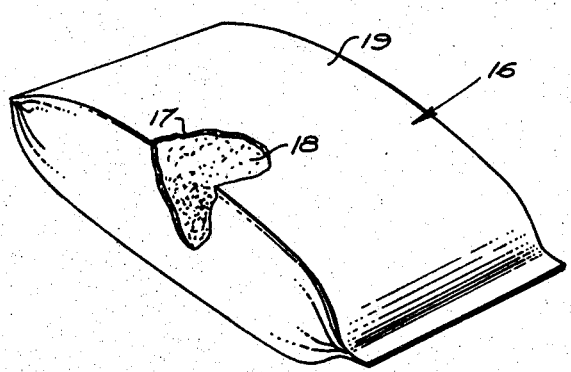
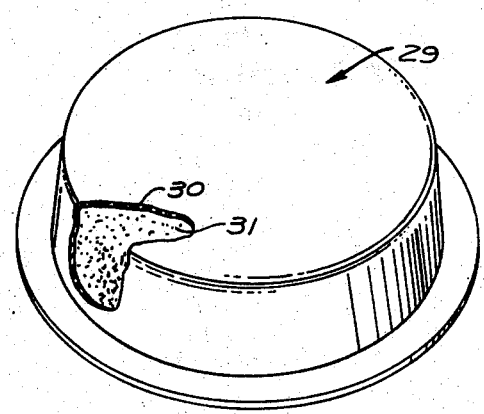
Sam I. Endo
James H. Tarrant
INVENTORS

BREWING MEANS FOR PREPACKAGED COFFEE

BACKGROUND OF THE INVENTION

In order to reduce the time required to make a decanter of coffee and to ensure a uniform product, especially desirable in restaurants, the use of prepackaged coffee is becoming increasingly popular. Apparatus to accomplish this has heretofore involved a container for the packaged coffee that includes a peripheral seal ring and a means of pressing the container against a surface surrounding the downwardly directed hot water spray head. This has subtracted from the benefits gained because an extra operation is required, and the seal ring groove in the margin of the container is difficult to maintain clean to the extent that the taste of the coffee brew is affected.

SUMMARY OF THE INVENTION

The present invention seeks to retain the advantages inherent in the use of prepackaged coffee while avoiding the disadvantages; accordingly, included in the objects of this invention are:

First, to provide a brewing means for packaged coffee which is so arranged that advantage is taken of the swelling action of coffee when wetted; that is, the upper wall of the package is pressed in sealing engagement with the surface surrounding a hot water spray head upon initial expansion of the coffee.

Second, to provide a coffee brewing means which incorporates a novel adapter insertable in a filter cone receiving brewing vessel to permit use of a coffee package in place of a filter cone, so that the brewing means may use a filter cone which receives loose coffee, or prepackaged coffee, thus permitting the brewing of a partial decanter of coffee should this be desired.

DESCRIPTION OF THE FIGURES

FIG. 1 is a plan view of the brewing vessel for the prepackaged coffee, showing therein, one form of the packaged coffee receiver.

FIG. 2 is a fragmentary, bottom view, showing that portion of the brewing means including the spray head which confronts the brewing vessel.

FIG. 3 is a sectional view thereof, taken through 3-3 of FIG. 1, and including the confronting portions of the brewing means, the packaged coffee receiver being shown in end elevation.

FIG. 4 is an enlarged, transverse, sectional view, taken through 4-4 of FIG. 1.

FIG. 5 is a plan view, similar to FIG. 1, showing the coffee brewing vessel and a modified form of the packaged coffee receiver.

FIG. 6 is an enlarged, fragmentary, sectional view, taken through 6-6 of FIG. 1, showing the confronting portions of the brewer, and showing the receiver with a coffee package therein as it appears when the brewer is first inserted and before the hot water is applied to the package.

FIG. 7 is a similar, fragmentary, sectional view, showing the condition of the coffee package after the coffee has swelled and the package has formed a sealed connection with the overlying surface of the brewer.

FIG. 8 is a fragmentary, sectional view, showing a modified profile of the downwardly facing surface surrounding the hot water spray head.

FIG. 9 is a perspective view, showing the rectangular form of the coffee package.

FIG. 10 is a similar, perspective view, showing the circular form of the coffee package.

The coffee brewing apparatus for which the present invention is adapted may be considered as conventional. One type is shown in U.S. Pat. No. 3,347,149. The brewing apparatus herein illustrated is intended primarily for home use. Other types are adapted primarily for restaurant use. The essential feature insofar as the present invention is concerned is that the brewing apparatus includes a housing 1, having a downwardly facing wall 2, in which is formed a spray head recess 3, containing a spray head 4. This spray head contains a number of ports 5, which discharge hot water in a downwardly diverging conical pattern. The spray head is connected to a suitable supply line 6 within the housing.

Secured to the wall 2, in spaced relation to the spray head recess 3, are guide brackets 7 which define three sides of a rectangle. The guide brackets are adapted to support a coffee brewing vessel 8 by means of a marginal rim 9, so that the upper surface of the coffee brewing vessel is held in relatively close proximity to the wall 2. The lower end of the brewing vessel is provided with an outlet 10 for brewed coffee. The coffee brewing vessel tapers downwardly and is provided internally with several peripheral steps 11 which are intended to support a conventional brewing cone formed of filter paper, not shown. In the exercise of the present invention, the filter cone is not used.

The upper peripheral step is utilized to support the corners of a rectangular coffee package receiver 12, having sidewalls 13, terminating at their lower margins in inturned flanges 14, the corners of which rest on the peripheral step. The open lower side of the receiver 12 is provided with a screen 15.

The receiver 12 is adapted to receive a rectangular coffee package 16, which per se, is conventional. The package includes a container 17 of filter paper, and is filled with a predetermined quantity of coffee 18. It is intended primarily that the quantity of coffee be sufficient to brew a full decanter of coffee; however, the quantity of coffee may vary, a medium brew, a weaker brew, and a stronger brew. For example, a 2¾ ounce quantity of coffee may be sufficient for a medium brew, whereas a 2½ ounce quantity of coffee is suitable for a weaker brew, and a 3 ounce quantity of coffee for a stronger brew. In order to accommodate this range of coffee quantity, the screen 15 may be arched, as indicated in FIG. 4.

The dimensions of the receiver 12 are preferably such that the upper surface 19 of the package clears but is in close proximity to the downwardly facing wall 2, or may actually contact the wall, particularly if the arched screen is employed. This condition is suggested in FIG. 6.

When hot water is applied through the spray head 4, against the central portion of the coffee package, a shallow pocket 20 is formed which tends to force the peripheral portion of the coffee package upwardly toward the wall 2. In the first few seconds of contact between the coffee and the hot water, the coffee swells, causing the margins 21 of the coffee package to press against the surface 2, as indicated in FIG. 7, forming a sealing contact therewith in the area surrounding the recess 3. It has been found that good sealing contact may be obtained even if the downwardly facing wall 2 is flat; particularly if the same quantity of coffee is used each time and the dimensions of the receiver are such that the upper surface of the package is initially in contact with the wall 2, or the arched screen is employed to accomplish the same purpose and the quantity of coffee varies to provide brews of different strength.

It is preferred, however, that the tolerances in the clearance between the coffee package and the wall 2 be relatively liberal. This is accomplished by providing annular ribs 22 within the boundaries of the coffee package so that as the coffee expands the upper surface of the package conforms to these ribs, improving the seal. In addition, a large or outer rib 23 mainly beyond the boundaries of the package except perhaps at the corners thereof. The outer rib 23 and the ribs 22 as well function during the short interval between initial contact of the hot water with the coffee grounds, and the swelling of the grounds to the extent that a complete seal is formed with the wall 2. During this initial relatively short period, water striking the central portion of the package may rebound to some extent and strike the downwardly facing wall and by reason of surface tension cling to the wall and move radially outward. This film of water, which is of minor volume, strikes the rib 23 or the ribs 22 and is deflected downward into the brewing vessel 8. It has also been found that the ribs 22 and 23 deflect downward water which might escape in the event the package is inadvertently ruptured. It has been found that the ribs may be relatively shallow and free of sharp edges. This is desirable for the reason that after the brew has been completed, and the brewing vessel is removed, the upper surface of the package may be deformed by the ribs as the package is withdrawn without tearing the package.

In place of the ribs 22 and 23, shallow steps 24 may be used, as indicated in FIG. 8, or a combination of such steps and the ribs may be employed.

Reference is directed to FIGS. 5 and 10. In place of the rectangular receiver 12, a circular receiver 25 may be employed, having radial fins 26 which rest on the upper peripheral step 11. The lower end of the receiver 25 is provided with an annular inturned flange 27 which supports a screen 28. The receiver 25 receives a circular coffee package 29, involving a container of filter paper 30, and coffee 31. The circular package seals against the wall 2 in the same manner as the rectangular coffee package.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A brewing apparatus for a package formed of filter material and containing a measured amount of coffee, said apparatus comprising:
    a. means forming a downwardly facing surface provided with at least one continuous downward projection;
    b. a hot water spray head mounted on said surface;
    c. means for supporting a coffee brewing vessel under said surface; and
    d. a container dimensioned to receive said package and place the upper end surface thereof in confronting relation to said spray head and a surrounding portion of said downwardly facing surface, whereby on wetting the coffee contained in said package, said coffee swells and the upper surface of said package engages said downwardly facing surface thereby to form a seal surrounding said spray head.

2. A brewing apparatus, as defined in claim 1, wherein:
    a. said downward projection is an annular shoulder sealingly engaged by said package as said coffee swells 3. A brewing apparatus, as defined in claim 1, wherein:
    a. means is provided on said downwardly facing surface for deflecting downwardly water tending to pass between said surface and said package.

4. A coffee brewing apparatus, as defined in claim 1, wherein:
    a. said brewing vessel includes inwardly directed step means; and
    b. said container is supportingly received upon said step means.

5. A coffee brewing apparatus for a flexible package of filter material having a charge of coffee therein, comprising:
    a. means forming a downwardly facing surface;
    b. a hot water spray head mounted on said surface;
    c. means for supporting a coffee brewing vessel under said surface;
    d. a coffee brewing vessel having an outlet at its lower end for discharge of coffee and including means for holding said package in close proximity to said spray head and the surrounding downwardly facing surface, whereby on wetting said coffee, said coffee swells thereby to force the upper side of said flexible package into sealing engagement with said surface; and
    e. a deflecting means depending from said surface and located principally beyond the margins of said package for deflecting into said vessel any water passing between said surface and said package.

6. A coffee brewing apparatus, as defined in claim 5, wherein:
    a. said deflecting means is a step depending from said surface.

7. A coffee brewing apparatus, as defined in claim 5, wherein:
    a. said deflecting means is an annular rib depending from said surface.

8. A coffee brewing apparatus, as defined in claim 7, wherein:
    a. other ribs depend from said surface and are disposed within the boundaries of said package.

9. A coffee brewing apparatus, as defined in claim 5, wherein:
    a. said means for holding said package includes an upwardly curved screen means disposed beneath said package.